Jan. 2, 1940.   O. LIEBMANN   2,185,377
COUPLED RANGE FINDER
Filed July 20, 1939   2 Sheets-Sheet 1

INVENTOR.
Oscar Liebmann.
BY
ATTORNEY.

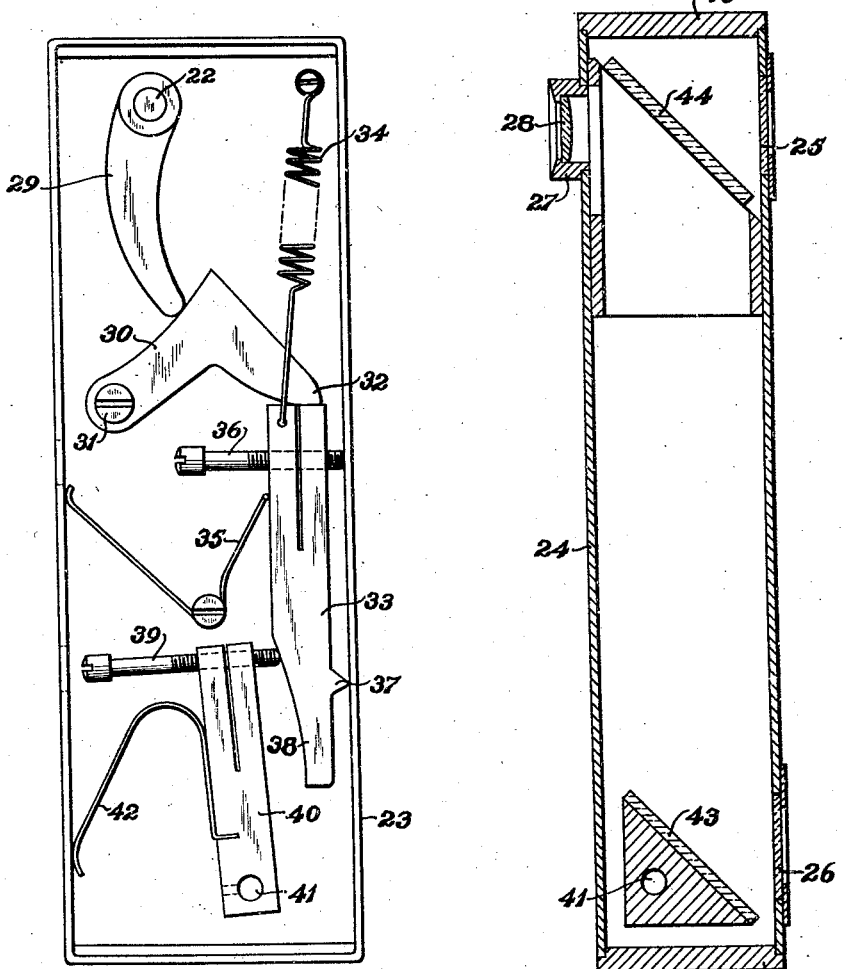

Patented Jan. 2, 1940

2,185,377

UNITED STATES PATENT OFFICE 2,185,377

COUPLED RANGE FINDER

Oscar Liebmann, Bergenfield, N. J., assignor to Q. O. S. Corporation, New York, N. Y., a corporation of New York Application July 20, 1939, Serial No. 285,527

6 Claims. (Cl. 95—44)

My invention relates to improvements in coupled range finders for still cameras of the type where one end of a movable arm is coupled to the sliding carriage of the camera and the other end through a system of levers operates the rotatable mirror of the range finder, and where the range finder has square viewing apertures.

An important object of my invention is to provide an easily adjustable range finder which may be fitted to any suitable camera.

A further object of my invention is to provide a range finder which is accurate in operation and gives correct settings even at very short and very long distances.

A still further object of my invention is to provide a range finder with an operating lever of fixed dimensions and where the adjustments may be made, once for all, inside the range finder proper, thus preventing unauthorized tampering with the instrument.

Other objects and advantages of the invention will be apparent during the course of the following description.

Figure 1:
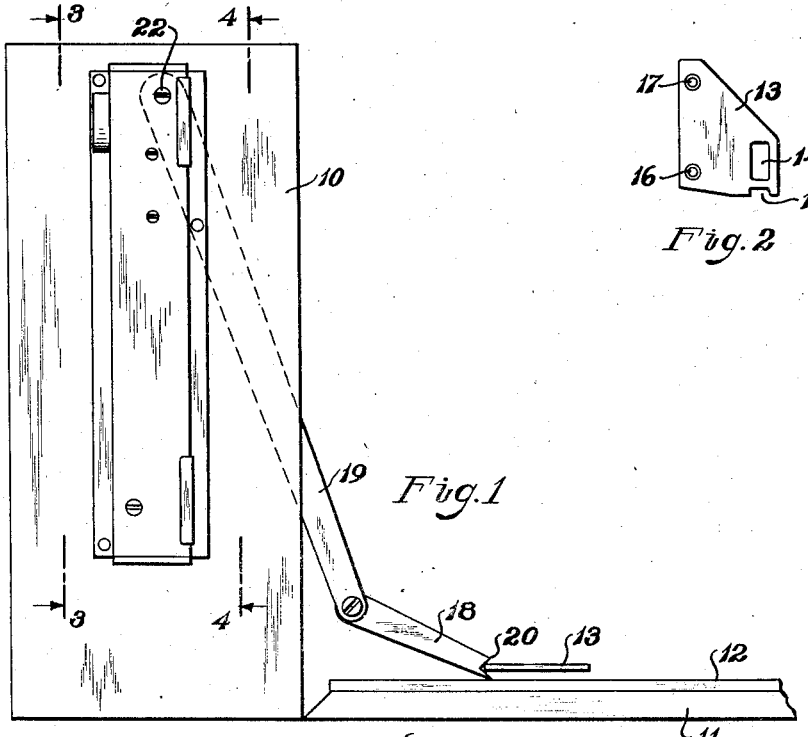
Figure 2:
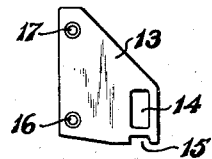
Figures 3, 4, 5:
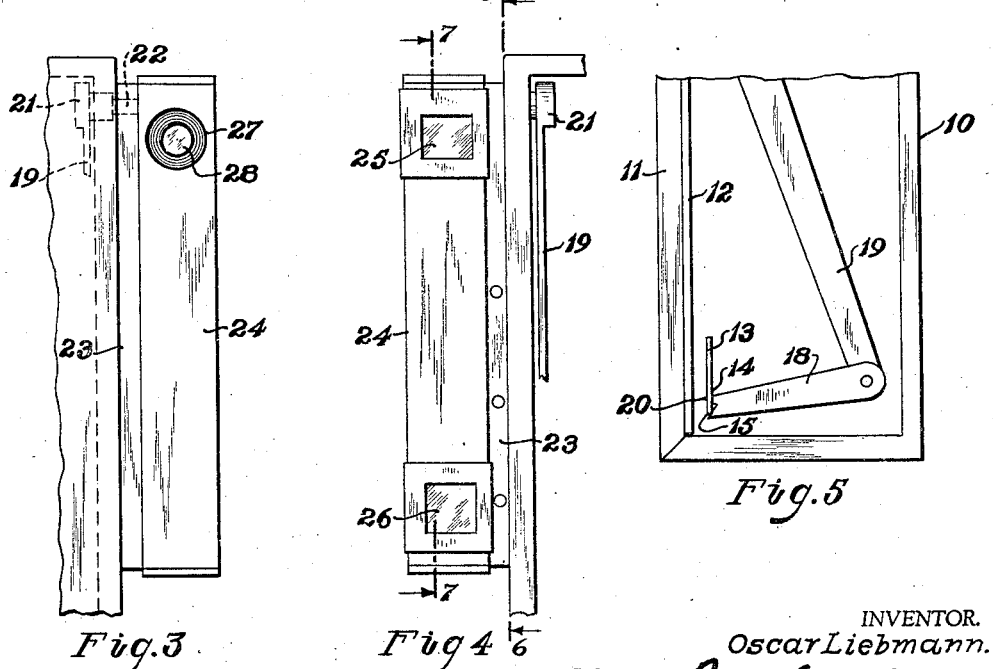

In the accompanying drawings, forming a part of this specification, and in which like numerals are employed to designate like parts throughout the same, Figure 1 is a side elevation of a camera with the range finder mounted in place, Figure 2 is a plan view of the plate attached to the carriage, Figure 3 is a partial elevation along line 3—3 in Fig. 1, Figure 4 is a partial elevation along line 4—4 in Fig. 1, Figure 5 is an inside view of the closed camera, Figure 6 is section along line 6—6 in Fig. 4, and, Figure 7 is a section along line 7—7 in Fig. 4.

In the drawings wherein for the purpose of illustration, is shown a preferred embodiment of my invention, the numeral 10 designates the case of the camera while 11 is the hinged cover with rails 12 on which the usual carriage travels which carries the lens mount. A plate 13 is fastened to the lens carriage in such a manner that one part of the plate projects over on one side of the carriage. The plate 13 is shown in detail in Figure 2 and has a hole 14 and a notch 15 besides the two holes 16 and 17 which serves to fasten plate 13 to the carriage.

A lever 18 notched at one end engages in notch 15 the other end being hinged to lever 19. The notched end of lever 18 has a point 20 which projects through hole 14 in plate 13 when the camera is folded, see Fig. 5. The other end of lever 19 is terminated in hub 21 which is fastened to shaft 22 and which extends through the wall of the camera 10 and into the range finder proper which consists of a base 23 upon which is mounted the square tube 24 having the square windows 25 and 26 and the viewing telescope 27 with lens 28.

In Figure 6 is shown the inside view of base 23. The shaft 22 extends clear through the base 23 and is journalled in the walls of the square tube 24. A lever 29 is rigidly mounted upon shaft 22 inside base 23. The free end of lever 29 is engaged with the curved side of the right angle lever 30 which is pivoted upon screw 31. The curved nose 32 of lever 30 is in engagement with the sliding cam 33 which is held against the nose 32 of lever 30 by spring 34. A spring 35 presses cam 33 against the inner side of base 23 where it rides upon the end of screw 36 and the projection 37. The lower end of the sliding cam 33 has on one side a curved cam face 38 against which is engaged the end of screw 39 which is extending through the end of a lever 40. The lever 40 is fastened to shaft 41 and is pressed against the sliding cam 33 by spring 42.

Referring now to Fig. 7, shaft 41 extends through, and is journalled in, the square tube 24 and carries the turnable mirror 43 which is placed inside the square tube adjacent to the square window 26. A semi-transparent mirror 44 is mounted in a fixed position between the square window 25 and the telescope 27. The square tube 24 is closed at both ends with covers 45 and 46 and has suitable mounting holes for fastening to base 23.

The operation of my invention is based upon the same principle as disclosed in Fig. 4 of my co-pending application, Serial No. 257,038, filed Feb. 18, 1939. By means of the movable mirror 43 the two pictures reflected upon mirror 44 (Fig. 7) are brought into coincidence. This corresponds to a given distance, and by coupling the movable mirror to the focusing adjustment the camera is automatically focused. In the present invention the coupling means consist of levers 18, 19, 29, 30, 40 and the sliding cam 33. One of the objects of an invention of this type is to provide a range finder which may be adjusted to a variety of different cameras. It is, therefore, necessary to have the coupling means adjustable inside of wide limits, and it is desirable, for practical reasons, to have the adjustable means inaccessible to prevent tampering. In the present invention, therefore, these objects have been attained by placing the adjustable means inside base 23. To make possible a wide range of adjustments there are two places where such adjustments may be made. The screw 36 may be reached through a hole in the side of base 23 and this screw will change the slope of the curved cam face 38 thereby making possible adjustments for variation in focal lengths. The screw 35 may also be reached through a hole in the side of base 23 and serves to adjust the movable mirror to correct position for infinite distance. Levers 19 and 40 and the sliding cam 33 are spring loaded so that when the camera is opened lever 18 will automatically stay in engagement with plate 13, and once adjusted, the movable mirror will always be in the correct angular relation to the focus of the camera lens.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:

1. In a coupled range finder of the character described comprising a fixed, semi-transparent reflector; a rotatable reflector located in optical relationship to said fixed reflector; a housing surrounding both reflectors; two substantially square windows in said housing, one in front of each reflector; a hollow base supporting said housing; a plurality of spring loaded levers located in said hollow base; a sliding cam interposed between said levers, and a linked lever coupling said spring loaded levers, cam and rotatable reflector to the camera carriage.

2. In a coupled range finder of the character described comprising a fixed, semi-transparent reflector; a rotatable reflector located in optical relationship to the fixed reflector; a housing surrounding both reflectors; two substantially square windows in said housing, one in front of each reflector; a viewing aperture in the rear of the fixed reflector; a hollow base supporting the housing; a plurality of spring loaded levers located in said hollow base; a sliding cam interposed between the levers, and a linked lever outside of the base coupling the spring loaded levers, cam and rotatable reflector to the camera carriage.

3. In a coupled range finder of the character described comprising a fixed, semi-transparent reflector mounted inside one end of a square tubing; a rotatable reflector pivoted inside the other end of the square tubing and in optical relationship with the fixed reflector; two substantially square windows located in one side of the square tubing, and one being in front of each of said reflectors; a viewing aperture located on the opposite side of the square tubing, in the rear of the fixed reflector; a hollow base fastened on one side of the square tubing; a plurality of spring loaded levers located in the hollow base; a sliding cam interposed between the levers, and a lever comprising two joined links coupling said rotatable reflector through the spring loaded levers and sliding cam to the lens carriage of a camera.

4. In a coupled range finder of the character described a range finder comprising a fixed and a movable mirror, mounted one in each end of a square tube; a hollow base fastened to one side of the square tubing; a shaft pivoted in the square tubing carrying said rotatable mirror, one end of the shaft extending in to the hollow base; a spring loaded lever fastened to said shaft inside the hollow base; a sliding cam engageable with the end of the lever; a right angle lever pivoted at one end inside the base, the other end being engaged with the end of the sliding cam; a third lever, pivoted inside the base at the opposite end from the first lever, and engaged with its end against one leg of said right angle lever; a shaft joining said third lever with a fourth lever on the outside of the base and a fifth lever turnably linked with the fourth lever whereby said system of levers may be coupled to the lens carriage of a camera.

5. In a coupled range finder of the character described a range finder comprising a fixed and a movable mirror, mounted in optical relation one in each end of a tubular housing, said housing having two substantially square windows and a viewing aperture in line with the mirrors; a hollow base fastened to one side of the tubular housing at right angles to the windows; a shaft pivoted in the square tubing carrying the rotatable mirror with one end of the shaft extending into the hollow base; a spring loaded lever fastened to the shaft inside the hollow base; a sliding cam the lower end of which has a curved face engaged with one end of said lever; a right angle lever pivoted at one end inside the base, the other end being engaged with the upper end of the sliding cam; screw adjustments between said first lever and the cam and between the cam and the base; a third lever, pivoted inside the base at the opposite end from the first lever, and engaged with its free end against one leg of said right angle lever; a shaft joining said third lever with a fourth lever on the outside of the base, and a fifth lever turnably linked with the fourth lever, whereby said system of levers, cam and turnable mirror is coupled to the lens carriage of a camera.

6. In a coupled range finder of the character described a range finder comprising a fixed and a movable mirror, mounted in optical relation one in each end of a tubular housing, said housing having two substantially square windows and a viewing aperture in line with the mirrors; a hollow base fastened to one side of the tubular housing at right angles to the windows; a shaft pivoted in the square tubing carrying the rotatable mirror with one end of the shaft extending into the hollow base; a spring loaded lever fastened to the shaft inside the hollow base; a sliding cam the lower end of which has a curved face engaged with one end of said lever; a right angle lever pivoted at one end inside the base, the other end being engaged with the upper end of the sliding cam; screw adjustments between said first lever and the cam and between the cam and the base; a third lever, pivoted inside the base at the opposite end from the first lever, and engaged with its free end against one leg of said right angle lever; a shaft pivoted in the housing upon which said third lever is mounted, said shaft extending through the back of the base into the camera; a fourth lever mounted on the shaft inside the camera; a fifth lever rotatably mounted to the other end of said fourth lever, and a perforated plate mounted on the camera carriage with which fifth lever is in engagement.

OSCAR LIEBMANN.